United States Patent Office 2,953,491
Patented Sept. 20, 1960

2,953,491
FUNGICIDE

William B. Hardy and John F. Hosler, Bound Brook, N.J., assignors to American Cyanamid Company, New York, N.Y., a corporation of Maine No Drawing. Filed Nov. 21, 1957, Ser. No. 697,771

4 Claims. (Cl. 167—33)

The present invention relates to improved biocidal compositions. More particularly, it relates to biocidal compositions comprising substituted aminotriazole derivatives. Specifically, the invention is concerned with biocidal compositions comprising as an active ingredient, a 3-acylamino triazole which may be characterized by the general formula:

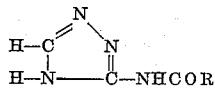

wherein R is either an alkyl radical of from 8–12 carbon atoms, such as octyl, nonyl, decyl, dodecyl, or an aryl radical, such as phenyl, nitrophenyl, chlorophenyl, naphthyl, methoxyphenyl, ethoxynaphthyl, isomers and equivalents thereof. Still more specifically, the invention relates to methods of protecting agricultural, organic and related articles from attack by microorganisms and nematodes employing the compounds herein defined.

It has been found that certain compounded mixtures containing the substituted aminotriazoles of the structure characterized above possess unusual biocidal, and particularly fungicidal, properties. These substituted aminotriazoles are effective in preventing or retarding fungus growth on seeds, soils, plants, fruits, wood, leather, synthetic paints and other organic matter.

In general, the substituted aminotriazoles of this invention can be readily synthesized. For instance, approximately 1 mole of an appropriate acyl halide derived from the corresponding carboxylic acid may be reacted with 3-amino-1,2,4-triazole. Resultant acylated product can be recovered, purified if necessary, and incorporated in a suitable inert solid or liquid carrier or diluent in any manner known to the art. As illustrative of acyl halides which may be employed herein, the following are contemplated: benzoyl chloride, o-methoxybenzoyl chloride, o-methoxybenzoyl bromide, p-chlorobenzoyl chloride, nonyl bromide, decoyl chloride, dodecoyl bromide, lauroyl chloride and caproyl chloride.

To assist in a complete understanding of the invention and, particularly, how the active biocidal compound is prepared, the following examples are presented for purposes of illustrating certain more specific details. Unless otherwise stated, the parts are by weight.

EXAMPLE 1

*3-o-methoxybenzamido-4H-1,2,4-triazole preparation*

To 8.4 parts of 3-amino-1,2,4-triazole is added 70 parts of o-methoxybenzoyl chloride. An exothermic reaction takes place and when the exotherm subsides, the mixture is permitted to stand at room temperature for about two hours before it is further processed. The reaction mixture is next filtered off and washed with ethyl alcohol. The desired product, 3-o-methoxybenzamido-4H-1,2,4-triazole melting at 257° C.– 258° C. analyzes as follows:

Calculated for $C_{10}H_{10}N_4O_2$: C, 55; H, 4.6; N, 25.6.
Found: C, 54.8; H, 4.40; N, 26.1.

EXAMPLE 2

*3-p-chlorobenzamido-4H-1,2,4-triazole preparation*

To 8.4 parts of 3-amino-1,2,4-triazole in 100 parts (by volume) of pyridine is added 17.5 parts of p-chlorobenzoyl chloride. An exotherm develops and when it subsides the reaction is said to be complete. The reaction mixture is then drowned in water and resultant white solid product is filtered off and air dried. The elemental analysis showed the following:

Calculated for $C_9H_7ClN_4O$: C, 48.5; H, 3.2; Cl, 15.8; N, 25.2. Found: C, 48.3; H, 3.47; Cl, 15.8; N, 24.8.

EXAMPLE 3

*β, Δ, Δ-trimethylcaproylamido-4H-1,2,4-triazole preparation*

17.6 parts of caproyl chloride are added to 8.4 parts of 3-amino-1,2,4-triazole in 40 parts (by volume) of pyridine. The reaction mixture is cooled to 5° C. and thereafter poured into water. Resultant desired product is separated and recovered by filtration. It is then washed with hot water followed by cold water and subsequently dried. The dry material is treated with boiling hexane and dried to give a product having a melting point of 188.5° C.–190° C. and on analysis shows the following:

Calculated for $C_{11}H_{20}N_4O$: C, 58.9; H, 8.93; N, 25.0.
Found: C, 58.7; H, 9.22; N, 25.5.

EXAMPLE 4

*3-lauroylamido-4H-1,2,4-triazole preparation*

21.9 parts of lauroyl chloride is added to a mixture of 8.4 parts of 3-amino-1,2,4-triazole, 12.6 parts of sodium bicarbonate and 200 parts (by volume) of dry benzene. The mixture is stirred vigorously and refluxed on a steam bath for two hours. Resultant solution is clarified by filtration, cooled and the resultant precipitated product recovered by filtration and dried. The latter recovered product is recrystallized twice from dimethylformamide, which product gives a melting point of 188.5° C.–189.5° C. and having an analysis as follows:

Calculated for $C_{14}H_{26}N_4O$: C, 63.2; H, 9.78; N, 21.05.
Found: C, 59.7; H, 9.52; N, 20.8

Advantageously, the compounds defined above are effective as biocides in dilute concentrations. It is preferred to incorporate the triazole derivatives in a variety of suitable solid or liquid carriers or diluents. It is also contemplated that such compositions may be in a form of a suspension in a suitable non-solvent or they may be prepared as dusts. For purposes of plant foliage treatment, a suspension or dispersion in a non-solvent, such as water, is preferred. For the protection of fruits, seeds and the like during storage, it has been found advantageous to treat the latter organic materials by employing an aqueous emulsion of the acylated aminotriazole. An emulsion can be formed by dissolving the biocide in an oil and emulsifying the resultant solution in water. Illustrative of the oil that can be used as a vehicle or solvent for the triazole derivative is contemplated a hydrocarbon such as benzene or toluene or halogenated hydrocarbons such as chlorobenzene and dichlorodifluoro methane.

The compounds of the present invention may further be applied to plant foliage by the aerosol method. Solutions for the aerosol treatment are prepared either by dissolving the appropriate 1,2,4-triazole directly in a highly volatile liquid carrier, such as trichlormethane, or by dissolving the substituted naphthoquinone in a lesser volatile solvent as for example benzene, and then mixing such solution with the highly volatile liquid aerosol carrier.

A fungicidal dust may also be prepared by mixing the instant substituted 1,2,4-triazoles with dusting materials, as for example clay, pyrophyllite, bentonite, pumice, fuller's earth and the like. Accordingly, seeds can be protected from soil organisms harmful to them by incorporating the present compounds with a solid carrier and mixing the composition with the seed as by tumbling.

The range weightwise of inert carrier or diluent to biocidal compound is quite broad, and is therefore not critical. It has been found that up to about 10% by weight of the compound, based upon the weight of the inert carrier, is generally quite adequate. In most cases, however, from about 0.01% to 1% of active ingredient and preferably about 0.15% is adequate for satisfactory aqueous dispersion preparation. Where a dust composition is desired, about 5% of active ingredient is more than satisfactory for most applications.

When the fungicidal compounds are employed in aqueous suspensions, the compositions may advantageously contain dispersing agents for the active compounds. Examples of such dispersing or surface active agents that can be utilized in forming dispersions include: the fatty acid esters of polyhydric alcohols (for example, Span), the sodium salt of a polymerized propyl naphthalene sulfonic acid (Daxad 11) and formed by condensing formaldehyde with propyl naphthalene sodium sulfonate, the alkylaryl-polyether alcohols (such as Triton X–100), the ethylene oxide addition products of such esters as for example "Tween" and the like. Usually a good practice is to add from one (1) to about five (5) parts of dispersing agent per 100 parts of fungicide compound.

The invention is further illustrated by the following examples; but it is not to be construed as limited thereto.

EXAMPLE 5

The toxic agents of the present invention were tested in this example for fungicidal action on spores of *Sclerotinia fructigena*.

The organism was easily cultured on potato dextrose agar slants and its spores were readily visible under low-power magnification. Spores were obtained in abundance from 14-day old cultures of *Sclerotinia fructigena*. The spores were washed from the agar slant with distilled water and were adjusted to a concentration of approximately 50,000 spores per cc. of water. Representative 1,2,4-triazole derivatives were dispersed in water in various concentrations given in the table below. Aliquots of this dispersion were then placed in separate vials with a definite concentration of spores (50,000 spores per cc. of water). In runs 1, 2 and 3 of Table I below, a surface active agent was not added to the mixture. However, in run 4, one (1) part of Daxad 11 was added to 100 parts of fungicide and mixed prior to dispersing the latter mixture in water. The suspension of spores in toxic agent was then kept mixed in a tumbling machine for a period of twenty hours. At the end of this time, the spores were examined under a microscope for germination. The results of these tests appear in the following table:

TABLE I

| Run | Compound | Percent Conc. of Compound | Percent Kill |
|---|---|---|---|
| 1 | 3-o-Methoxybenzamido-4H-1,2,4-Triazole | 0.01 | 95 |
| 2 | 3-p-Chlorobenzamido-4H-1,2,4-Triazole | 0.01 | 50 |
| 3 | 3-Lauroylamido-4H-1,2,4-Triazole | 0.01 | 50 |
| 4 | Compound of Run 1 and Daxad 11 | 0.01 | 90 |
| 5 | 3-β,Δ,Δ-Trimethylcaproylamido-4H-1,2,4-Triazole | 0.01 | 100 |
| 6 | 3-Amino-1,2,4-4H-Triazole | 0.1 | 0 |

EXAMPLE 6

This example illustrates the herbicidal activity of the substituted aminotriazoles defined previously.

Radish seeds which represent dicotyledonous plants are treated with the compounds more particularly characterized below. In a suitable container, approximately 50 radish seeds are added to an aqueous medium containing active biocidal compound. The resultant mixture is then intimately admixed by tumbling for approximately twenty hours. The seed mortality is determined by standard germination tests after the treatment. The results are reported in the table below:

TABLE II

| Compound | Conc. of Compound, Percent | Percent Kill |
|---|---|---|
| 3-p-Chlorobenzamido-4H-1,2,4-Triazole | 0.1 | 100 |
| 3-Methoxybenzamido-4H-1,2,4-Triazole | 0.1 | 100 |
| 3-Amino-1,2,4-Triazole | 0.1 | 26 |

From the above data, it will be readily seen that the compounds of the present invention are approximately four times as effective as is a related herbicidal compound.

I claim:

1. The method of protecting organic materials susceptible to damage by fungi which comprises: applying to said organic material a biocidal composition comprising an inert carrier and from at least 0.01 to 10.0 percent by weight, based on the total weight of said biocidal composition of a 3-acylamino-1,2,4-triazole characterized by the formula:

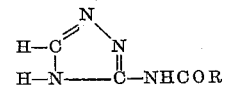

wherein R is a substituent selected from the group consisting of an alkyl radical of at least eight but not more than twelve carbon atoms and an aryl radical.

2. The method according to claim 1 in which the triazole compound is 3-β,Δ,Δ-trimethylcaproylamido-4H-1,2,4-triazole.

3. The method according to claim 1 in which the triazole compound is 3-p-chlorobenzamido-4H-1,2,4-triazole.

4. The method according to claim 1 in which the triazole compound is 3-o-methoxybenzamido-4H-1,2,4-triazole.

References Cited in the file of this patent

UNITED STATES PATENTS 2,763,661     Grundmann et al. _____ Sept. 18, 1956

OTHER REFERENCES

Cook et al.: Chem. Abstracts, vol. 45, col. 629 (1951).
Atkinson et al.: J. Chem. Soc., 1954, pp. 4508–10.